United States Patent
Suto et al.

(10) Patent No.: US 9,592,816 B2
(45) Date of Patent: Mar. 14, 2017

(54) POWER TRANSMITTING APPARATUS

(71) Applicant: HONDA MOTOR CO., LTD., Tokyo (JP)

(72) Inventors: Junichi Suto, Utsunomiya (JP); Xingwei Ning, Mooka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 14/467,162

(22) Filed: Aug. 25, 2014

(65) Prior Publication Data

US 2015/0065296 A1 Mar. 5, 2015

(30) Foreign Application Priority Data

Sep. 3, 2013 (JP) ................................ 2013-182403

(51) Int. Cl.
*B60W 10/02* (2006.01)
*B60W 10/08* (2006.01)
*B60W 30/188* (2012.01)

(52) U.S. Cl.
CPC ............ *B60W 10/02* (2013.01); *B60W 10/08* (2013.01); *B60W 30/188* (2013.01); *B60W 2510/0638* (2013.01); *B60W 2520/28* (2013.01); *B60W 2710/083* (2013.01); *Y02T 10/7258* (2013.01); *Y10T 477/27* (2015.01)

(58) Field of Classification Search
CPC .... B60W 10/02; B60W 10/08; B60W 30/188; B60W 2520/28; B60W 2510/081; Y10T 477/26

See application file for complete search history.

(56) References Cited

U.S. PATENT DOCUMENTS 6,321,865 B1 * 11/2001 Kuribayashi .......... B60K 6/365
                                                                 180/243
2013/0178320 A1 * 7/2013 Suzuki ................... B60K 6/448
                                                                 475/151

FOREIGN PATENT DOCUMENTS

| JP | 07-285350 A | 10/1995 |
|---|---|---|
| JP | 2004-175313 A | 6/2004 |
| JP | 2004-210015 A | 7/2004 |
| JP | 2005-080437 A | 3/2005 |
| JP | 2008-195233 A | 8/2008 |

OTHER PUBLICATIONS

Japanese Office Action application No. 2013-182403 dated May 7, 2015.
Japanese Office Action application No. 2013-182403 mailed Feb. 10, 2015.

* cited by examiner

*Primary Examiner* — Stacey Fluhart
(74) *Attorney, Agent, or Firm* — Squire Patton Boggs (US) LLP

(57) ABSTRACT

A power transmitting apparatus mounted on a vehicle includes a right motor unit connected to a right rear wheel and having a right clutch, and a left motor unit connected to a left rear wheel and having a left clutch. The power transmitting apparatus has an ECU. The ECU detects respective power transmitting capabilities of the clutches, and adjusts the torque of a right motor or a left motor if the power transmitting capability of at least one of the right motor unit and the left motor unit is varied.

7 Claims, 7 Drawing Sheets

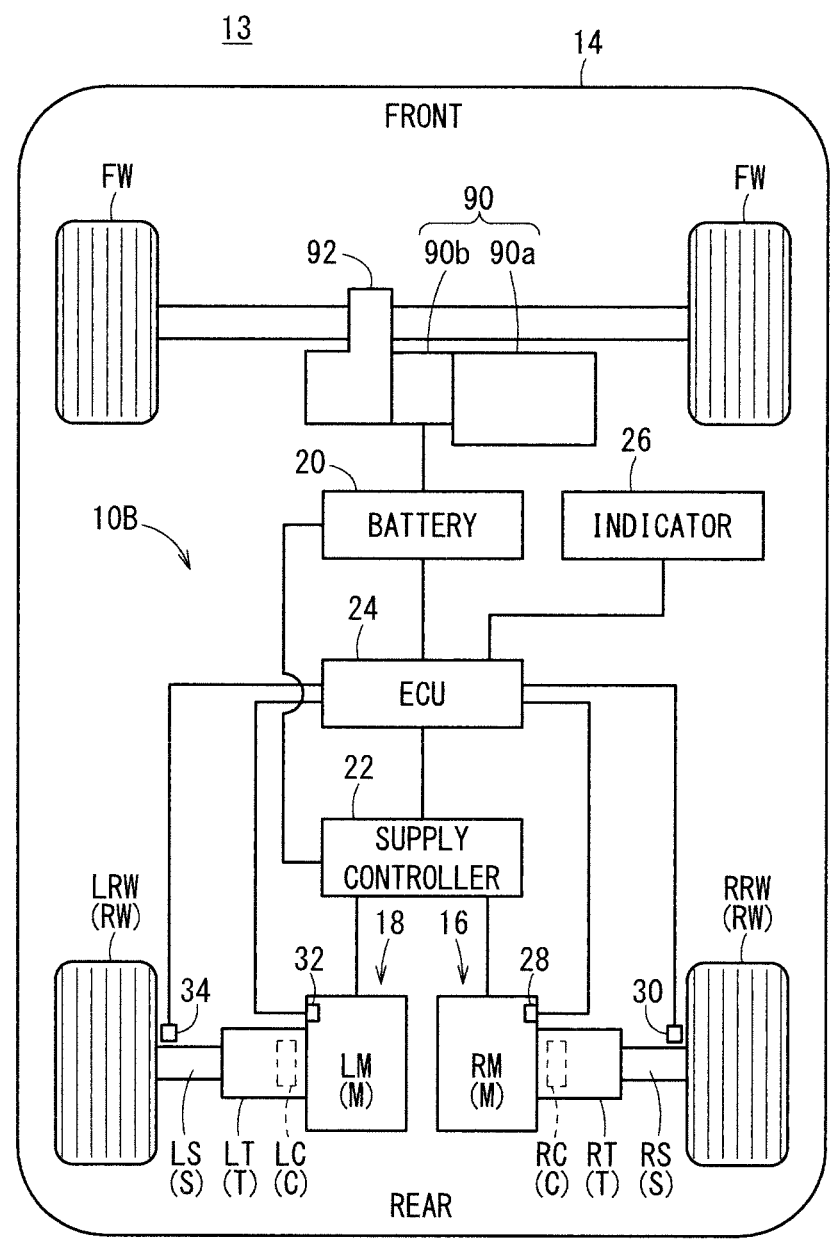

POWER TRANSMITTING APPARATUS

CROSS-REFERENCE TO RELATED APPLICATION

This application is based upon and claims the benefit of priority from Japanese Patent Application No. 2013-182403 filed on Sep. 3, 2013, the contents of which are incorporated herein by reference.

BACKGROUND OF THE INVENTION

Field of the Invention

The present invention relates to a power transmitting apparatus for transmitting rotational drive power independently to a pair of left and right drive wheels of a vehicle.

Description of the Related Art

From the standpoint of increasing the transmissibility of rotational drive power to the drive wheels of automobiles, attention has recently been focused on a system that has a plurality of motor units for individually rotating the respective drive wheels of an automobile. For example, Japanese Laid-Open Patent Publication No. 07-285350 discloses an electric automobile having a pair of left and right drive wheels, which are connected respectively to two motor units each having an electric motor as a prime mover. Each of the motor units includes a transmitting mechanism such as a universal joint, a speed reducer, a torque converter, or the like disposed between the electric motor and the drive wheel. Rotational drive power from the electric motor is transmitted through the transmitting mechanism to the drive wheel.

Although not disclosed in Japanese Laid-Open Patent Publication No. 07-285350, certain motor units of the type described above include a transmission disposed between the electric motor and the drive wheel. If a transmission, which is capable of switching between a low-speed torque and a high-speed torque, is used as such a transmission, then the transmission is effective to increase the range of speeds at which the vehicle can travel. Each of respective transmissions, which are included in the left and right motor units, includes a clutch for intermittently transmitting or blocking drive power from the electric motor.

SUMMARY OF THE INVENTION

The clutches that are incorporated in the transmissions tend to start slipping, and hence the power transmitting capabilities of the transmissions are lowered as the clutch plates are subjected to wear during use. If one of the left and right motor units has a slipping clutch, then the left and right motor units are susceptible to transmitting different amounts of drive power to the respective drive wheels, leading to a reduction in the driving performance of the vehicle.

It is an object of the present invention to provide a power transmitting apparatus, which has a pair of drive units connected respectively to the left and right drive wheels of a vehicle and including respective clutches, the power transmitting apparatus being capable of allowing the vehicle to maintain good driving performance even if the power transmitting capabilities of the clutches are changed.

To achieve the above object, in accordance with the present invention, a power transmitting apparatus is provided including a pair of drive units connected respectively to a pair of drive wheels of a vehicle, the drive units having respective clutches configured to selectively transmit and block drive power from respective prime movers, and a controller configured to detect respective power transmitting capabilities of the clutches, and adjust the drive power from the prime movers or the power transmitting capabilities of the clutches if the power transmitting capability of at least one of the drive units is varied.

As described above, the power transmitting apparatus according to the present invention includes the controller, which adjusts the drive power from the prime movers or the power transmitting capabilities of the clutches if the power transmitting capability of at least one of the drive units is varied. Therefore, the vehicle is controlled in such a manner that the vehicle travels smoothly. For example, if the clutch of one of the drive units is slipping, thereby resulting in a reduction in the power transmitting capability thereof, the controller adjusts the drive power of the suitable prime mover to equalize the power outputs of the drive units. If the vehicle has another power source for propelling the vehicle, then the controller may disengage the clutches, i.e., may adjust the power transmitting capabilities thereof to nil, so that the vehicle can be driven continuously by the other power source. The vehicle, which incorporates the above power transmitting apparatus therein, can have good driving performance.

The controller may acquire respective torque transmission ratios of the clutches as the power transmitting capabilities of the clutches, based on rotational speeds of respective output shafts of the prime movers and rotational speeds of the drive wheels.

Since the controller acquires respective torque transmission ratios of the clutches as the power transmitting capabilities of the clutches, the power transmitting apparatus can monitor a change in the torque transmission ratios for easily determining the states of the clutches.

If the power transmitting capability of one of the drive units is lowered, the controller should preferably lower the drive power from the prime mover of the other of the drive units to a level at which the respective power outputs transmitted from the drive units to the drive wheels are equalized.

Since the controller lowers the drive power from the prime mover of the other of the drive units to a level at which the respective power outputs transmitted from the drive units to the drive wheels are equalized, the power transmitting apparatus can bring the rotational drives of the drive wheels into agreement with each other, and thereby achieve good driving performance of the vehicle.

If the power transmitting capability of one of the drive units is lowered, the controller may lower the drive power from the prime mover of the one of the drive units to a level such that the power transmitting capabilities of the clutches do not decrease.

Inasmuch as the controller lowers the drive power from the prime mover of the one of the drive units to a level such that the power transmitting capabilities of the clutches do not decrease, the vehicle can be driven while the clutch is prevented from slipping, and hence the clutch is protected against damage.

In addition, the controller may equalize the drive power from the prime mover of the other of the drive units to the drive power from the prime mover of the one of the drive units.

Since the controller equalizes the drive power from the prime mover of the other of the drive units with the drive power from the prime mover of the one of the drive units, the rotational drives of the drive wheels are brought into agreement with each other to thereby achieve good driving performance of the vehicle.

Alternatively, if the power transmitting capability of one of the drive units is lowered, the controller may disengage both of the clutches of the drive units.

When both of the clutches of the drive units are disengaged in this manner, the drive wheels are allowed to rotate passively, and the vehicle can continue to be driven by another power source mounted on the vehicle.

The power transmitting apparatus may further include an indicating unit configured to indicate to an occupant of the vehicle a reduction in the power transmitting capability of one of the drive units, if the power transmitting capability of the one of the drive units is reduced.

As described above, since the power transmitting apparatus further includes the indicating unit, the indicating unit early indicates to the vehicle occupant the fact that the power transmitting capability of the clutch is reduced, and thus the occupant can be prompted to service the power transmitting apparatus for maintenance or repair.

According to the present invention, the vehicle, which includes the drive units connected to the respective drive wheels, has good driving performance even if the power transmitting capability of at least one of the clutches is varied.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 7 is a schematic plan view of a vehicle incorporating a power transmitting apparatus according to a third embodiment of the present invention.

DESCRIPTION OF THE PREFERRED EMBODIMENTS

Power transmitting apparatus according to preferred embodiments, i.e., first through third embodiments, of the present invention will be described in detail below with reference to the accompanying drawings.

The power transmitting apparatus according to the present invention is mounted on an automobile and transmits drive power to drive wheels of the automobile. The automobile on which the power transmitting apparatus is mounted is not limited to any particular kind of automobile, but may be an automobile with three or more wheels, insofar as the automobile has a pair of left and right drive wheels on the vehicle body. However, a power transmitting apparatus, which is mounted on a four-wheeled automobile (hereinafter referred to as a "vehicle"), will be described in specific detail below.

First Embodiment

Figure 1:
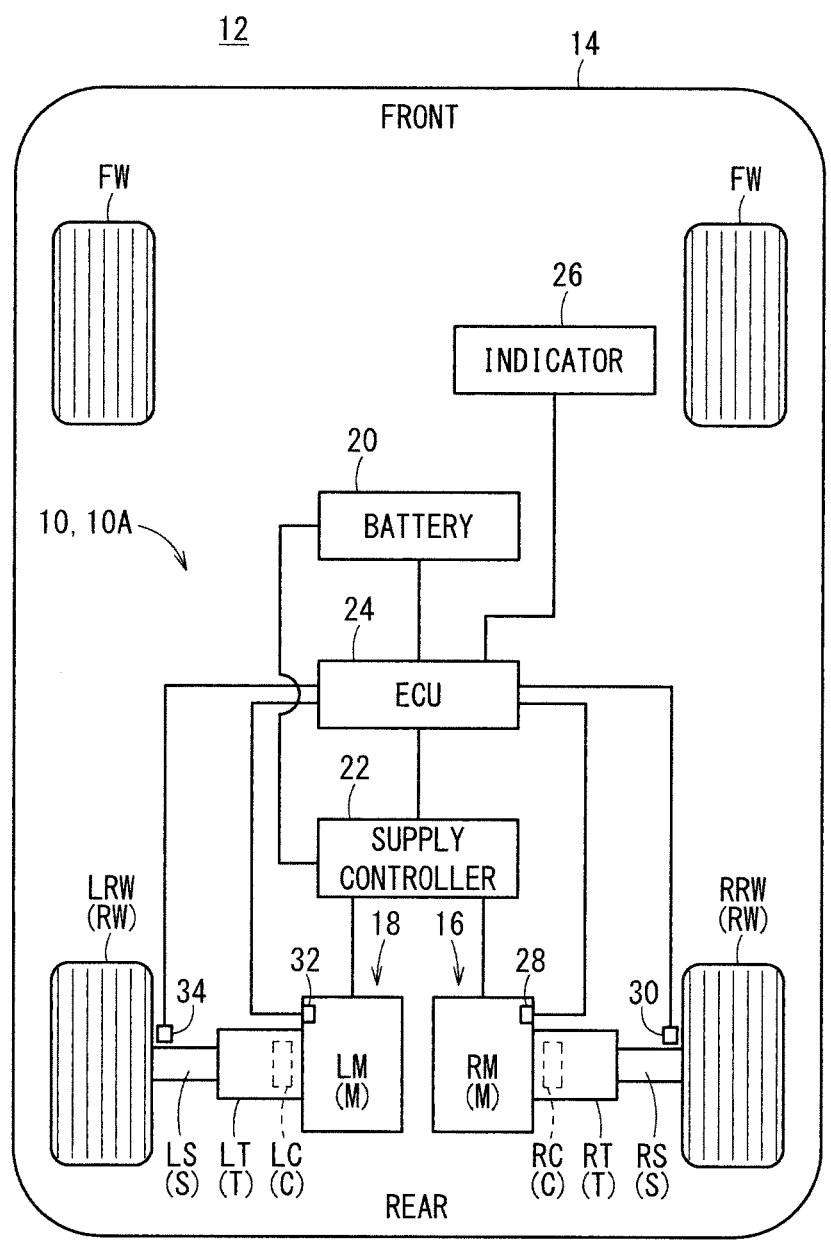
FIG. 1 is a schematic plan view of a vehicle incorporating a power transmitting apparatus according to a first embodiment of the present invention.

As shown in FIG. 1, a vehicle 12 has a vehicle body 14, and a pair of front wheels FW and a pair of rear wheels RW that serve as drive wheels. The power transmitting apparatus 10 according to a first embodiment of the present invention is mounted on the vehicle body 14 for independently rotating the rear wheels RW, i.e., a right rear wheel RRW and a left rear wheel LRW. The power transmitting apparatus 10 includes a right motor unit 16 (drive unit) for driving the right rear wheel RRW, and a left motor unit 18 (drive unit) for diving the left rear wheel LRW. The right motor unit 16 will hereinafter be referred to as a "right unit 16", and the left motor unit 18 will hereinafter be referred to as a "left unit 18". The drive wheels, which are rotated by the power transmitting apparatus 10, are not limited to any particular road wheels, but may be the front wheels FW or the rear wheels RW, or both the front wheels FW and the rear wheels RW.

The right unit 16 has a right motor RM (prime mover), a right transmission RT, and a right shaft RS, which are arranged successively from the center to the right of the vehicle 12. The right motor RM, which is a power source for the right rear wheel RRW, rotates a motor shaft 36 (output shaft; see FIG. 2) based on electric power supplied from a battery 20 mounted on the vehicle 12. The right transmission RT transmits the rotation of the motor shaft 36 of the right motor RM selectively at a plurality of different gear ratios. The right transmission RT incorporates a right clutch RC therein. The right shaft RS has an outer end connected to the right rear wheel RRW, and transmits the rotational drive power at a gear ratio selected by the right transmission RT to the right rear wheel RRW.

The left unit 18 is of a symmetrical structure to the right unit 16. More specifically, the left unit 18 has a left motor LM (prime mover) as a power source, a left transmission LT having a left clutch LC, and a left shaft LS connected to the left rear wheel LRW.

The right motor RM and the left motor LM will be referred to collectively as motors M, and the right transmission RT and the left transmission LT will be referred to collectively as a transmission T. Similarly, the right clutch RC and the left clutch LC will be referred to collectively as clutches C, and the right shaft RS and the left shaft LS will be referred to collectively as shafts S. In addition, the right rear wheel RRW and the left rear wheel LRW will be referred to collectively as rear wheels RW.

The power transmitting apparatus 10 includes, in addition to the right unit 16 and the left unit 18, a battery 20, a supply controller 22, an ECU (Electronic Control Unit) 24, and an indicator 26. The battery 20 is electrically connected to the ECU 24 to energize the ECU 24, and supplies electric power to the right motor RM and the left motor LM. Consequently, the vehicle 12 is an electric vehicle that can be propelled by the motors M, i.e., the right motor RM and the left motor LM, which are energized by electric power supplied from the battery 20.

The battery 20 can be charged by a charging system that is located outside of the vehicle 12, or can store energy regenerated from the right transmission RT, the left transmission LT, the brake, etc. Electric power from the battery 20 may be supplied to an overall electric system of the vehicle 12.

The supply controller 22, which is disposed between the right motor RM, the left motor LM, and the battery 20, controls the amount of electric power supplied from the battery 20 to the right motor RM and the left motor LM, as well as the timings at which electric power is supplied to the right motor RM and the left motor LM. The supply controller 22 is connected electrically to the ECU 24, receives control signals CS (see FIG. 3) from the ECU 24, and controls the supply of electric power from the battery 20 based on the received control signals CS. The supply controller 22 is capable of individually controlling supply of electric power from the battery 20 to the right motor RM and the left motor LM.

The ECU 24 serves as a controller for electronically controlling various pieces of information used to control the power transmitting apparatus 10. According to a major control process, the ECU 24 controls driving of the vehicle 12 based on information of an accelerator opening selected by the driver (occupant) of the vehicle 12, and information of the brake applied by the driver.

For example, when the ECU 24 receives an accelerator opening from a non-illustrated accelerator pedal position sensor, the ECU 24 establishes amounts of electric power to be supplied to the right motor RM and the left motor LM, and supplies a control signal CS depending on the established amounts of electric power to the supply controller 22. Further, based on the speed of the vehicle 12, etc., the ECU 24 instructs the right transmission RT and the left transmission LT to switch between the gear ratios. The ECU 24 preferably has a function to control overall operations of the vehicle 12 for accurately controlling the power transmitting apparatus 10.

To the ECU 24, there are electrically connected an RM sensor 28 and an RS sensor 30, which are associated with the right unit 16, and an LM sensor 32 and an LS sensor 34, which are associated with the left unit 18. The RM sensor 28 detects a rotational speed of the motor shaft 36 of the right motor RM. The RS sensor 30 detects a rotational speed of the right shaft RS, i.e., the right rear wheel RRW. The LM sensor 32 detects a rotational speed of the motor shaft 36 of the left motor LM. The LS sensor 34 detects a rotational speed of the left shaft LS, i.e., the left rear wheel LRW. Each of the sensors 28, 30, 32, 34 comprises a known type of sensor, such as a rotary encoder or the like.

The ECU 24 processes detected signals from the sensors 28, 30, 32, 34 in order to calculate respective torque transmission ratios (power transmission capabilities) of the right clutch RC and the left clutch LC. A control process, which is carried out by the ECU 24 to control the right motor RM and the left motor LM based on the calculated torque transmission ratios, will be described later.

The indicator 26, which is electrically connected to the ECU 24, is disposed on a non-illustrated instrument panel (e.g., near a tachometer) of the vehicle 12. The indicator 26 serves as an indicating unit, which is energized when the ECU 24 detects a malfunction of the right clutch RC or the left clutch LC. When the driver of the vehicle 12 confirms that the indicator 26 has been energized, the driver recognizes that a malfunction of the right clutch RC or the left clutch LC has occurred, and takes an appropriate action to service the vehicle 12 for repair, maintenance, or the like.

Figure 2:
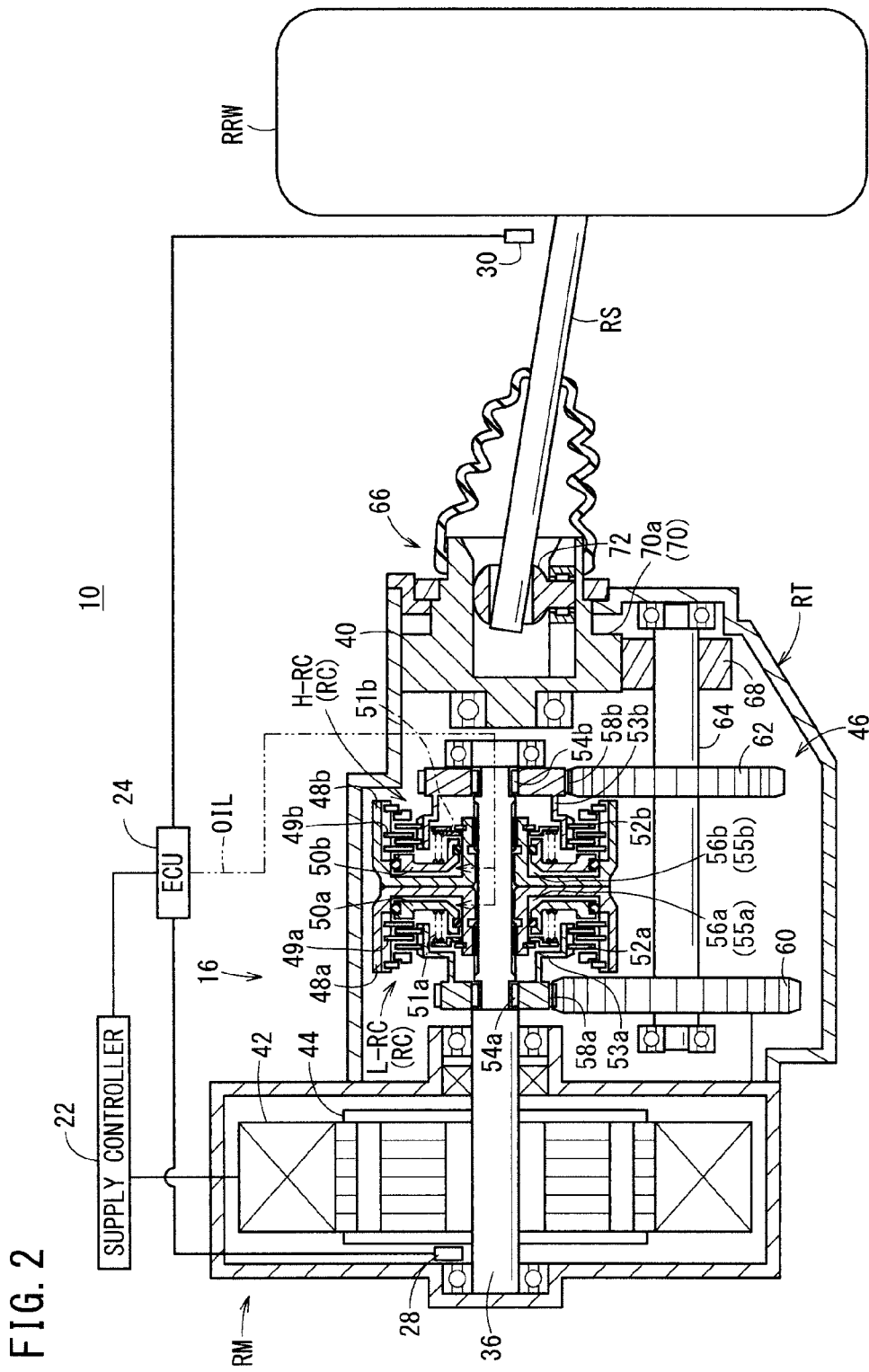
FIG. 2 is a cross-sectional view of a right motor unit shown in FIG. 1.

Specific structural details of the drive units will be described below with reference to FIG. 2. The right unit 16 will be described in detail below as a representative drive unit.

The right unit 16 includes a casing 40 in which the right motor RM, the right transmission RT, and an inner end portion of the right shaft RS are accommodated. The casing 40 has separate compartments for housing the right motor RM and the right transmission RT, respectively, so as to prevent metal powder particles from moving between the right motor RM and the right transmission RT.

The right motor RM has a substantially annular stator 42 securely positioned in the casing 40, and a rotor 44 disposed axially centrally in the stator 42. The stator 42, which is made up of a non-illustrated electric conductor in the form of coils, generates a magnetic field radially inwardly in a predetermined direction around the axis of the stator 42 depending on a current that flows through the electric conductor. The rotor 44 includes the motor shaft 36, which is supported by bearings in the casing 40, and permanent magnets, not shown, which are fixed to the motor shaft 36. The rotor 44 rotates about its own axis under the influence of the magnetic field generated by the stator 42. The RM sensor 28 is mounted in the casing 40.

The motor shaft 36 projects from the rotor 44 to the right and extends into the compartment of the casing 40 in which the right transmission RT is accommodated. The right transmission RT includes the right clutch RC provided on the motor shaft 36 and a transmitting mechanism 46 for transmitting rotational drive power from the right clutch RC to the right shaft RS.

The right clutch RC has a low-speed clutch L-RC and a high-speed clutch H-RC for transmitting rotational drive power from the right motor RM selectively with a low-speed torque and a high-speed torque. The low-speed clutch L-RC, which is disposed closely to the right motor RM, includes a clutch guide 48a, a plurality of clutch plates 49a, a piston 50a, a spring 51a, a plurality of clutch disks 52a, a drive gear 53a, and a needle bearing 54a. The high-speed clutch H-RC, which is disposed remotely from the right motor RM, is of a structure that is formed symmetrically with respect to the low-speed clutch L-RC. The high-speed clutch H-RC includes a clutch guide 48b, a plurality of clutch plates 49b, a piston 50b, a spring 51b, a plurality of clutch disks 52b, a drive gear 53b, and a needle bearing 54b. Since the high-speed clutch H-RC is structurally identical to the low-speed clutch L-RC, except for being arranged symmetrically with respect thereto, only structural details of the low-speed clutch L-RC will be described below, whereas the structural details of the high-speed clutch H-RC will not be described.

The clutch guide 48a has an inner sleeve splined to the motor shaft 36, an outer sleeve surrounding the inner sleeve, and a bottom wall interconnecting the inner sleeve and the outer sleeve. The bottom wall defines a space 55a between the outer circumferential surface of the inner sleeve and the inner circumferential surface of the outer sleeve. The clutch plates 49a, the piston 50a, etc., are accommodated in the space 55a. Each of the clutch plates 49a is shaped in the form of a ring having a toothed outer circumferential surface. The outer sleeve of the clutch guide 48a has a toothed inner circumferential surface, which is held in meshed engagement with the toothed outer circumferential surface of each of the clutch plates 49a.

The piston 50a is disposed between the inner and outer sleeves of the clutch guide 48a for movement along the axis of the motor shaft 36 in the clutch guide 48a. The piston 50a is normally urged to move toward the bottom wall of the clutch guide 48a by the spring 51a, which is disposed in the space 55a. A hydraulic pressure chamber 56a is defined jointly between the clutch guide 48a and the piston 50a in the space 55a. Oil is supplied to and discharged from the hydraulic pressure chamber 56a through an oil passage defined in the motor shaft 36.

Each of the clutch disks 52a is shaped in the form of a ring having a toothed inner circumferential surface, and faces the clutch plates 49a. The drive gear 53a has gear teeth on an outer circumferential surface thereof, which are held in mesh with the toothed inner circumferential surface of each of the clutch disks 52a. There are as many clutch disks 52a as the number of clutch plates 49a. Each of the clutch disks 52a has a highly frictional facing on one of the surfaces thereof. When the clutch disks 52a are brought into contact with the clutch plates 49a, the facings of the clutch disks are forced into frictional engagement with the clutch plates 49a, thereby transmitting rotational drive power from the clutch plates 49a to the drive gear 53a.

The drive gear 53a includes a support on which the clutch disks 52a are supported, and a gear that is joined to an end of the support. The gear of the drive gear 53a is rotatably mounted on the motor shaft 36 by the needle bearing 54a, and gear teeth 58a, which are formed on the outer circumferential surface of the drive gear 53a, are held in meshed engagement with a driven low-speed gear 60 of the transmitting mechanism 46.

The hydraulic pressure chamber 56a of the low-speed clutch L-RC is supplied with oil from the oil passage, which is defined in the motor shaft 36, under the control of the ECU 24. Under the hydraulic force of the supplied oil, the piston 50a is displaced away from the bottom wall of the clutch guide 48a, thereby pressing the clutch plates 49a axially along the motor shaft 36 in face-to-face contact with the facings of the clutch disks 52a, whereupon the low-speed clutch L-RC is engaged. At this time, rotational drive power from the motor shaft 36 is transmitted from the clutch guide 48a to the clutch plates 49a, to the clutch disks 52a, and to the drive gear 53a, and further is transmitted from the gear teeth 58a to the transmitting mechanism 46. On the other hand, when oil is discharged from the hydraulic pressure chamber 56a whereby the pressure is decreased, the piston 50a is displaced toward the bottom wall of the clutch guide 48a under the bias of the spring 51a. At this time, since the clutch plates 49a and the clutch disks 52a are spaced from each other, the low-speed clutch L-RC is disengaged.

The high-speed clutch H-RC can be engaged and disengaged in the same manner as the low-speed clutch L-RC. The ECU 24 controls the supply of oil in order to selectively engage and disengage the low-speed clutch L-RC and the high-speed clutch H-RC, or to cut off transmission of rotational drive power through the right clutch RC.

The transmitting mechanism 46 is capable of transmitting the rotational drive power of the right clutch RC to the right shaft RS. The transmitting mechanism 46 has the driven low-speed gear 60, a driven high-speed gear 62, a countershaft 64, and a constant velocity joint 66. The driven low-speed gear 60 meshes with the drive gear 53a, and the driven high-speed gear 62 meshes with the drive gear 53b. The countershaft 64 extends in an axial direction centrally through and is fixed to the driven low-speed gear 60 and the driven high-speed gear 62. An end portion of the countershaft 64 projects to the right and is joined to a gear 68, which is capable of transmitting rotational drive power to the constant velocity joint 66.

The constant velocity joint 66, which comprises a tripod constant velocity joint, includes a tubular outer member 70 having gear teeth 70a held in meshed engagement with the gear 68, and an inner member 72 that is accommodated in the outer member 70 and supports an inner end of the right shaft RS. When rotational drive power from the gear 68 is transmitted to the outer member 70, the outer member 70 rotates about its own axis, thereby rotating the inner member 72. When the inner member 72 is rotated, the constant velocity joint 66 rotates the right shaft RS.

The tilt (joint angle) of the right shaft RS, which is supported by the inner member 72, is varied when the inner member 72 is slidably displaced axially within the outer member 70. The right shaft RS includes a Birfield constant velocity joint, not shown, on the outer end thereof, for transmitting rotational drive power from the transmitting mechanism 46 at a constant velocity to the right rear wheel RRW. The RS sensor 30 is disposed in the vicinity of the outer end of the right shaft RS.

The right unit 16 is constructed basically as described above. The left unit 18 is structurally symmetrical to the right unit 16 (see FIG. 1). The power transmitting apparatus 10 actuates the right unit 16 and the left unit 18 independently of each other. When the vehicle travels in a straight or forward direction, the power transmitting apparatus 10 rotates the right rear wheel RRW and the left rear wheel LRW at equal speeds of rotation. Therefore, essentially, the ECU 24 controls the supply controller 22 to supply equal amounts of electric power to the right motor RM and the left motor LM.

The ECU 24 of the power transmitting apparatus 10 controls the right unit 16 and the left unit 18 in order to rotate the right rear wheel RRW and the left rear wheel LRW, respectively, while recognizing the states of the right clutch RC and the left clutch LC. Functions of the ECU 24 will be described below with reference to FIG. 3.

The ECU 24 adjusts the rotational speed of the right rear wheel RRW and the rotational speed of the left rear wheel LRW in agreement with each other, based on the torque transmission ratios of the right clutch RC and the left clutch LC. In order to carry out operations to synchronize the right rear wheel RRW and the left rear wheel LRW, the ECU 24 has an RM rotational speed acquirer 74, an RS rotational speed acquirer 76, an LM rotational speed acquirer 78, an LS rotational speed acquirer 80, a right unit capability calculator 82, a left unit capability calculator 84, and a control processor 86.

The RM rotational speed acquirer 74 has an input terminal connected to the RM sensor 28. The RM rotational speed acquirer 74 receives an output signal from the RM sensor 28 and acquires data representing the rotational speed of the right motor RM. The RS rotational speed acquirer 76 has an input terminal connected to the RS sensor 30. The RS rotational speed acquirer 76 receives an output signal from the RS sensor 30 and acquires data representing the rotational speed of the right shaft RS. The LM rotational speed acquirer 78 has an input terminal connected to the LM sensor 32. The LM rotational speed acquirer 78 receives an output signal from the LM sensor 32 and acquires data representing the rotational speed of the left motor LM. The LS rotational speed acquirer 80 has an input terminal connected to the LS sensor 34. The LS rotational speed acquirer 80 receives an output signal from the LS sensor 34 and acquires data representing the rotational speed of the left shaft LS.

The right unit capability calculator 82 is connected to output terminals of the RM rotational speed acquirer 74 and the RS rotational speed acquirer 76, and hence, the right unit capability calculator 82 is supplied with the rotational speed of the right motor RM and the rotational speed of the right shaft RS. Based on the rotational speed of the right motor RM, the amount of electric power supplied to the right motor RM, etc., the right unit capability calculator 82 calculates a torque of the right motor RM. In addition, based on the rotational speed of the right motor RM and the rotational speed of the right shaft RS, the right unit capability calculator 82 calculates a torque transmission ratio of the right clutch RC in the right transmission RT.

The torque transmission ratio is defined as a ratio of the rotational speed of a shaft S (the right shaft RS or the left shaft LS) to the rotational speed of a motor M (the right motor RM or the left motor LM). Since a transmission T (the right transmission RT or the left transmission LT) is disposed between the motor M and the shaft S, the rotational speed of the shaft S is lower than the rotational speed of the motor M, depending on the speed ratio of a low-speed torque or a high-speed torque of the transmission T. The right unit capability calculator 82 includes information concerning the speed ratio of the right transmission RT, and calculates a torque transmission ratio based on a value representing the rotational speed of the right motor RM as modified by the speed ratio and the rotational speed of the right shaft RS.

The left unit capability calculator 84 is connected to output terminals of the LM rotational speed acquirer 78 and the LS rotational speed acquirer 80, and hence, the left unit capability calculator 84 is supplied with the rotational speed of the left motor LM and the rotational speed of the left shaft LS. Similar to the right unit capability calculator 82, based on the rotational speed of the left motor LM, the amount of electric power supplied to the left motor LM, etc., the left unit capability calculator 84 calculates a torque of the left motor LM. In addition, based on a value representing the rotational speed of the left motor LM as modified by the speed ratio of the left transmission LT and the rotational speed of the left shaft LS, the left unit capability calculator 84 calculates a torque transmission ratio of the left clutch LC.

The control processor 86 has input terminals connected respectively to the right unit capability calculator 82 and the left unit capability calculator 84, and output terminals connected respectively to the supply controller 22 and the indicator 26. The control processor 86 is supplied with the torque transmission ratio of the right clutch RC and the torque of the right motor RM from the right unit capability calculator 82, and also is supplied with the torque transmission ratio of the left clutch LC and the torque of the left motor LM from the left unit capability calculator 84. Based on the supplied torques and torque transmission ratios, the control processor 86 determines the amount by which the torque transmission ratios of the right clutch RC and the left clutch LC differ from each other.

If the difference between the torque transmission ratios is equal to or greater than a predetermined value, the control processor 86 changes the control signal CS that is sent to the supply controller 22 in order to lower the power output of the motor M associated with the clutch C, the torque transmission ratio of which is not lowered or has not been lowered enough. Based on the control signal CS, the supply controller 22 changes the supplied amount of electric power so as to reduce the rotational drive of the designated motor M. As a result, the rotation of the right rear wheel RRW driven by the right unit 16 and the rotation of the left rear wheel LRW driven by the left unit 18 are adjusted to thereby be brought into substantial agreement with each other.

Figure 4A:
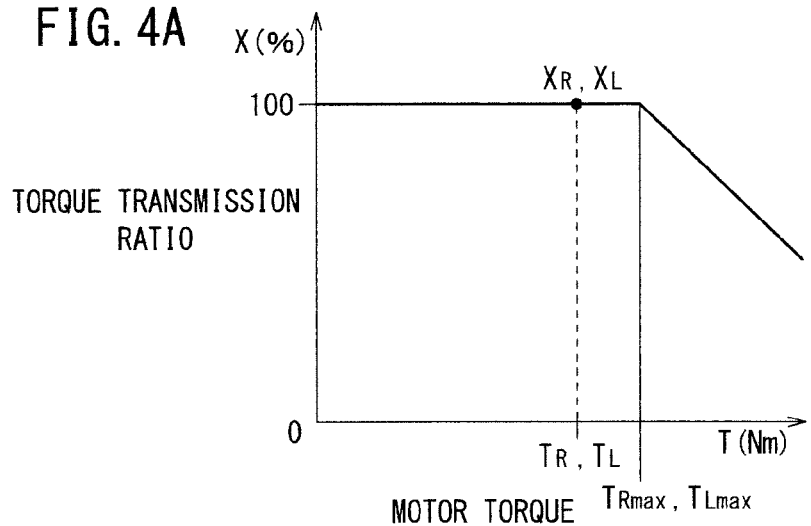
FIG. 4A is a first graph showing a relationship between the torque and the torque transmission ratio of right and left motor units shown in FIG. 1.

The above control process, which is carried out by the control processor 86, will be described in greater detail with reference to FIGS. 4A through 4C. The torque transmission ratios $X_R$, $X_L$ of the clutches C (the right clutch RC and the left clutch LC) are 100% or nearly 100% when the clutches C are not slipping, and are lower than 100% when the clutches C are slipping.

In particular, when the torques $T_R$, $T_L$ of the motors M (the right motor RM and the left motor LM) are small, the clutch plates 49a, 49b and the clutch disks 52a, 52b of the clutches C are held in contact with each other under sufficient frictional forces. As indicated by the solid-line curve in FIG. 4A, the clutches C operate in a stable transmission region in which the torque transmission ratios $X_R$, $X_L$ are kept at a high level (substantially 100%) until the torques $T_R$, $T_L$ of the right motor RM and the left motor LM reach predetermined torques (allowable transmission torques $T_{Rmax}$, $T_{Lmax}$).

If the torques $T_R$, $T_L$ of the motors M exceed the allowable transmission torques $T_{Rmax}$, $T_{Lmax}$, a failure occurs in which the clutch disks 52a, 52b fail to stick to the clutch plates 49a, 49b, thus causing the clutches C to slip. Even if the clutches C are functioning normally, the torque transmission ratios $X_R$, $X_L$ are gradually lowered in a transmission ratio reduction region beyond the stable transmission region. More specifically, during normal functioning of the clutches C, the torque transmission ratios $X_R$, $X_L$ are gradually lowered substantially at the same timing and gradient, as indicated by the solid-line curve in FIG. 4A.

Figure 4B:
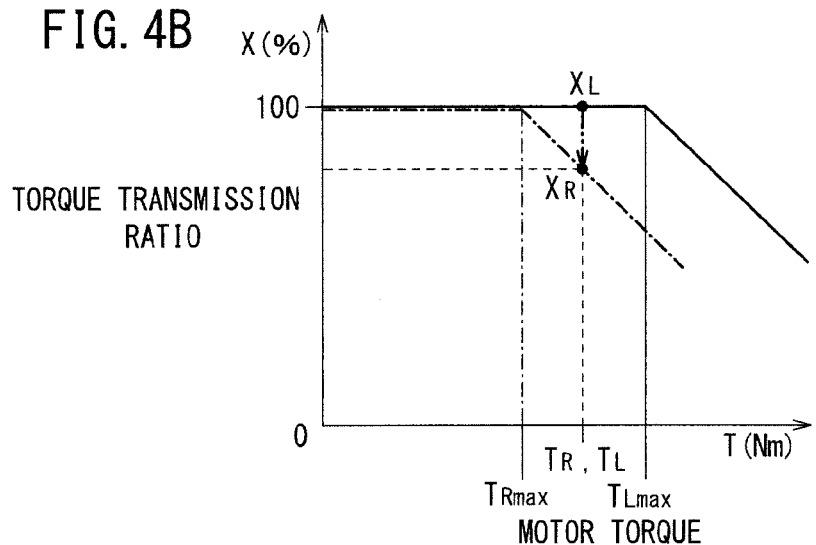
FIG. 4B is a second graph showing a relationship between the torque and the torque transmission ratio during slippage of a clutch.
Figure 4C:
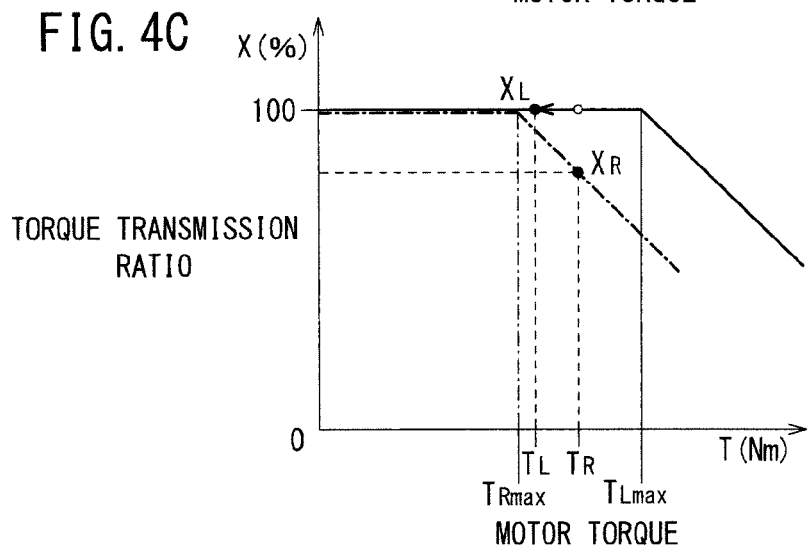
FIG. 4C is a third graph illustrating the manner in which a control process of an ECU shown in FIG. 1 is performed on the basis of the relationship shown in FIG. 4B.

If the frictional forces between the clutch plates 49a, 49b and the clutch disks 52a, 52b of the clutches C become weaker due to wear or the like, then as shown in FIG. 4B, the stable transmission region becomes smaller, i.e., the torque transmission ratios $X_R$, $X_L$ are lowered or the allowable transmission torques $T_{Rmax}$, $T_{Lmax}$ are lowered. Therefore, the control processor 86 is capable of judging whether or not the right clutch RC or the left clutch LC is malfunctioning or experiencing wear, by monitoring the reduction in the torque transmission ratios $X_R$, $X_L$ for the torques $T_R$, $T_L$ of the right motor RM and the left motor LM.

For example, if the clutch plates 49a, 49b and the clutch disks 52a, 52b of the right clutch RC become worn, then the transmission ratio reduction region slides horizontally to the left, as indicated by the dot-and-dash-line curve in FIG. 4B. In particular, at the torque $T_R$ shown in FIG. 4B, the control processor 86 is supplied with a torque transmission ratio $X_R$ (e.g., 80%), which is less than 100%, from the right unit capability calculator 82.

Stated otherwise, during times that the torque $T_R$ of the right motor RM is small, the right clutch RC slips, thereby causing the rotation of the right rear wheel RRW, which is driven by the right unit 16, and the rotation of the left rear wheel LRW, which is driven by the left unit 18, to become different from each other. As a result, if the vehicle 12 is continuously driven, the driving performance of the vehicle 12 is lowered, due to difficulty in controlling the traveling state of the vehicle 12 and a reduction in efficiency of the energy that is used to drive the vehicle 12, for example.

To avoid the aforementioned shortcomings, when the torque transmission ratio of one of the clutches C is lower than the torque transmission ratio of the other clutch C by a predetermined level or greater, the control processor 86 performs a control process for lowering the torque (rotational speed: power) of one of the motors M, which is combined with the clutch C having the higher torque transmission ratio. For example, as shown in FIG. 4B, if the torque transmission ratio $X_R$ of the right clutch RC decreases to 80%, the control processor 86 lowers the torque $T_L$ of the left motor LM. At this time, the control processor 86 may vary the torque $T_L$ of the left motor LM, based on the ratio of the reduction in the torque transmission ratio $X_R$. For example, the control processor 86 may vary the torque $T_L$ of the left motor LM according to the following equation (1).

$$T_L = T_R (X_R / 100) \quad (1)$$

In a similar manner, if the torque transmission ratio $X_L$ of the right clutch LC decreases, then the control processor 86 may vary the torque $T_R$ of the right motor RM according to the equation $T_R = T_L (X_L / 100)$, in which the variables are simply the opposite of those in the above equation (1).

Having calculated the torque $T_L$ of the left motor LM, the control processor 86 sends a control signal CS to the supply controller 22 in order to supply an appropriate amount of electric power depending on the calculated torque $T_L$. Based on the control signal CS, the supply controller adjusts the amount of electric power supplied to the left motor LM. Therefore, the rotational drive power of the left unit 18 is controlled so as to become substantially equalized with the rotational drive power of the right unit 16. As a consequence, the power transmitting apparatus 10 rotates the right rear wheel RRW and the left rear wheel LRW at the same rotational speed.

The power transmitting apparatus 10 according to the first embodiment basically is constructed as described above. A processing sequence of the ECU 24 will be described below with reference to FIG. 5. In addition, advantages attributable to the processing sequence of the ECU 24 will be described below.

After the ECU 24 has been activated through an action taken by the driver of the vehicle 12 who is currently driving the vehicle 12, in step S1, the ECU 24 determines whether or not the driver has operated the accelerator pedal based on a detected accelerator opening. If the ECU 24 judges that the driver has operated the accelerator pedal (step S1: YES), then in step S2, the ECU 24 sends a control signal CS depending on the operated accelerator pedal to the supply controller 22, which energizes the right unit 16 and the left unit 18. Unless the torques of the motors M exceed the allowable transmission torques $T_{Rmax}$, $T_{Lmax}$, the clutches C are not slipping, and hence, the right unit 16 and the left unit 18 transmit the rotational drive power at high torque transmission ratios to the rear wheels RW, so that the traveling speed of the vehicle 12 can be increased smoothly.

Thereafter, in step S3, the ECU 24 receives detected signals from the RM sensor 28, the RS sensor 30, the LM sensor 32, and the LS sensor 34, to thereby acquire rotational speeds of the motors M and rotational speeds of the shafts S.

Next, in step S4, based on the acquired rotational speeds, the ECU 24 calculates the torque transmission ratios of the clutches C. More specifically, based on the rotational speed of the right motor RM and the rotational speed of the right shaft RS, the right unit capability calculator 82 calculates a torque transmission ratio $X_R$ of the right clutch RC. In addition, based on the rotational speed of the left motor LM and the rotational speed of the left shaft LS, the left unit capability calculator 84 calculates a torque transmission ratio $X_L$ of the left clutch LC.

The control processor 86 compares the two torque transmission ratios $X_R$, $X_L$, which were calculated in step S4, and then in step S5, determines the difference between the torque transmission ratios $X_R$, $X_L$ depending on the torques $T_R$, $T_L$ of the motors M. If the control processor 86 judges that the difference between the torque transmission ratios $X_R$, $X_L$ of the right clutch RC and the left clutch LC is equal to or greater than a predetermined value, i.e., if the control processor 86 determines the occurrence of a torque transmission ratio failure (step S5: YES), then control proceeds to step S6. If the control processor 86 judges that the difference between the torque transmission ratios $X_R$, $X_L$ of the right clutch RC and the left clutch LC is almost nil, i.e., if the control processor 86 determines that a torque transmission ratio failure has not occurred (step S5: NO), then control skips to step S9.

In step S6, the control processor 86 performs a control process for equalizing the rotational drive power of the right unit 16 and the left unit 18. More specifically, based on the ratio of the reduction in the torque transmission ratio according to the above equations including equation (1), the control processor 86 lowers the torque (rotational speed) of the motor that is associated with the clutch, the torque transmission ratio of which has not decreased. In other words, the control processor 86 calculates a torque for the motor associated with the clutch having a torque transmission ratio that has not decreased.

Next, in step S7, the control processor 86 generates a control signal CS based on the calculated torque, and sends the generated control signal CS to the supply controller 22 for thereby energizing the right unit 16 and the left unit 18. In this manner, the power transmitting apparatus 10 brings the rotation of the right rear wheel RRW, which is driven by the right unit 16, and the rotation of the left rear wheel LRW, which is driven by the left unit 18, into agreement with each other, thereby controlling the vehicle 12 to travel smoothly with ease.

If the control processor 86 judges that either one of the torque transmission ratio $X_R$ of the right clutch RC and the torque transmission ratio $X_L$ of the left clutch LC has dropped by a predetermined value or greater (step S5: YES), then in step S8, the control processor 86 turns on the indicator 26. By observing the indicator 26, which has been turned on, the driver of the vehicle 12 recognizes that one of the clutches of the power transmitting apparatus 10 is slipping.

In step S9, the ECU 24 determines whether or not the vehicle 12 has stopped traveling, by judging whether or not the driver has operated the accelerator pedal. If the ECU 24 judges that the vehicle 12 is currently traveling (step S9: NO), then control returns to step S3 and steps S3 through S9 are repeated. Consequently, even if the torques of the motors M are varied continuously during driving of the vehicle 12, the control processor 86 can generate appropriate control signals CS in order to control the power transmitting apparatus 10. If the ECU 24 judges that the vehicle 12 has stopped traveling (step S9: YES), then the processing sequence of the ECU 24 is brought to an end.

As described above, the ECU 24 of the power transmitting apparatus 10 according to the first embodiment adjusts the torque (drive power) of one of the right motor RM and the left motor LM, in the event that the torque transmission ratio of one of the right unit 16 and the left unit 18 is varied. Stated otherwise, if the clutch of either one of the right unit 16 and the left unit 18 is slipping, the ECU 24 adjusts the power output of the appropriate motor M in order to equalize the power outputs of the right unit 16 and the left unit 18.

Therefore, the vehicle 12, which incorporates the power transmitting apparatus 10 therein, has good driving performance.

Since the power transmitting apparatus 10 determines the torque transmission ratios $X_R$, $X_L$ of the clutches C as respective power transmission capabilities thereof, the power transmitting apparatus 10 is capable of monitoring changes in the torque transmission ratios $X_R$, $X_L$, for thereby easily judging the states of the clutches C. The power transmitting apparatus 10 can lower the power output of the motor associated with the clutch the torque transmission ratio of which has not decreased, to a level at which the power outputs supplied to the right rear wheel RRW and the left rear wheel LRW are equalized. Consequently, the rotational drives of the right rear wheel RRW and the left rear wheel LRW are brought into agreement with each other for thereby achieving good driving performance of the vehicle 12.

The power transmitting apparatus 10 includes the indicator 26 for indicating to the driver of the vehicle 12 a reduction in the torque transmission ratios $X_R$, $X_L$ of the clutches C. When the indicator 26 is turned on, the driver is prompted to inspect or repair the power transmitting apparatus 10. Each of the clutches C tends to slip when a high torque (load) is applied thereto, even though the clutches C may be operating normally. In this case, the indicator 26, which is turned on, prompts the driver to reduce the traveling speed of the vehicle 12.

Second Embodiment

Figure 3:
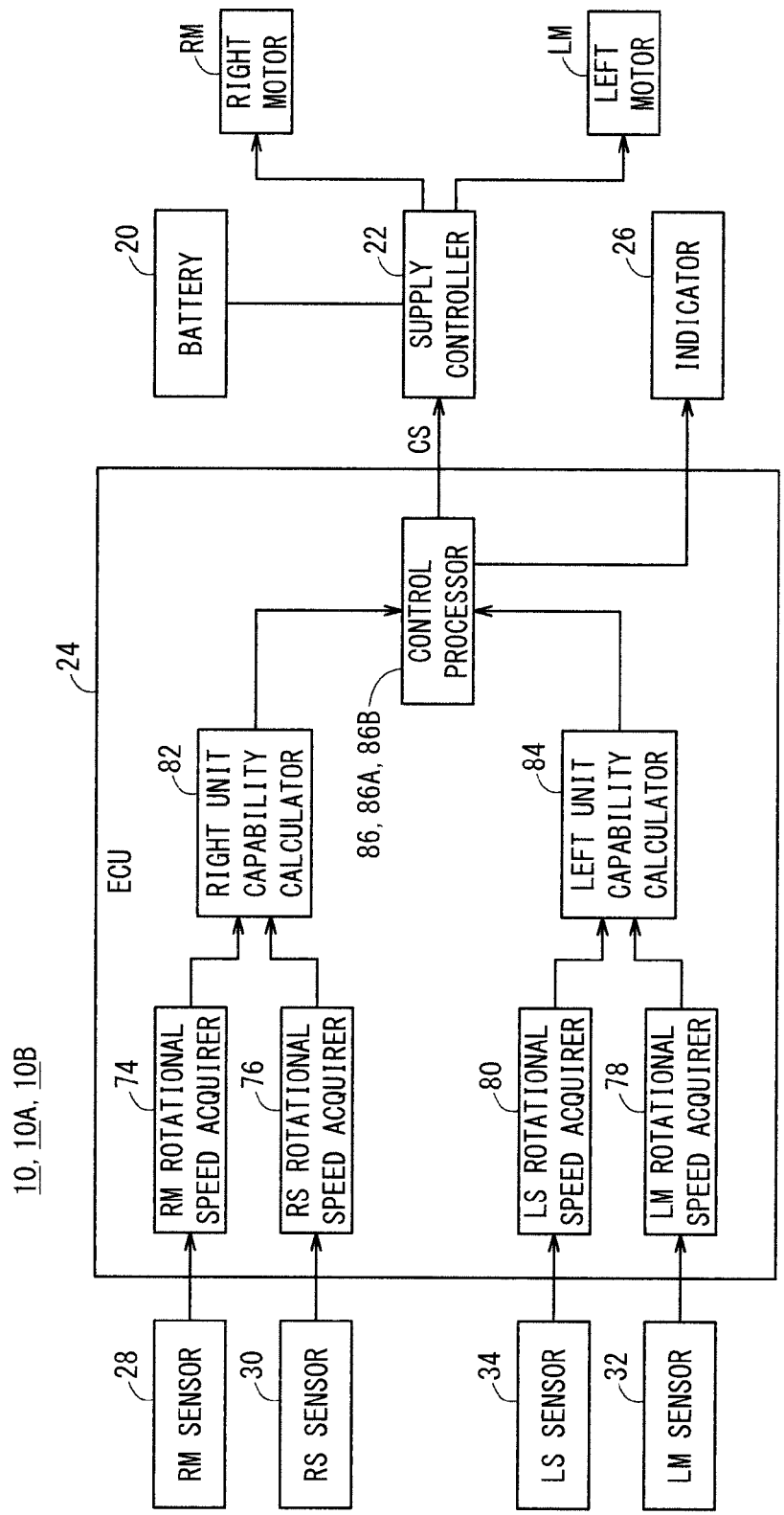
FIG. 3 is a functional block diagram of the power transmitting apparatus shown in FIG. 1.
Figure 6A:
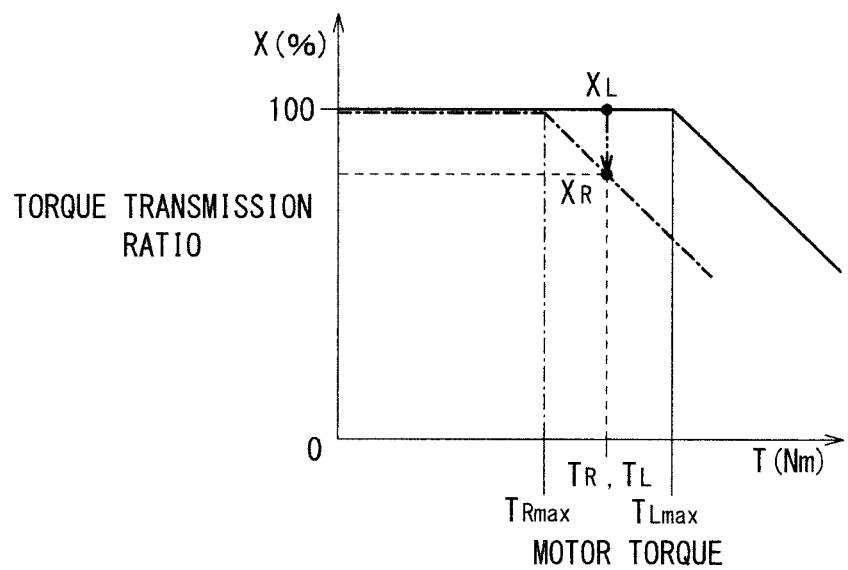
FIG. 6A is a first graph showing a relationship between the torque and the torque transmission ratio of right and left motor units of a power transmitting apparatus according to a second embodiment of the present invention during slippage of a clutch.
Figure 6B:
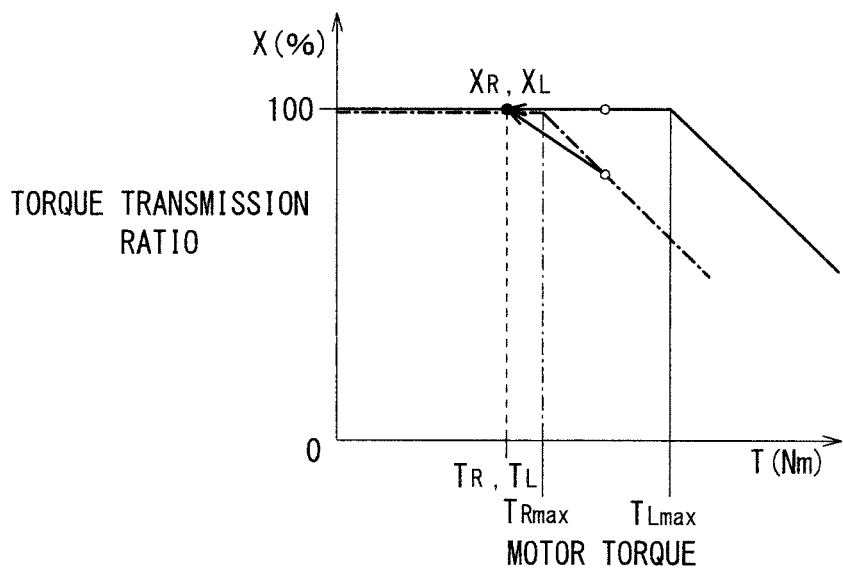
FIG. 6B is a second graph illustrating the manner in which a control process of an ECU of the power transmitting apparatus is performed on the basis of the relationship shown in FIG. 6A.

A power transmitting apparatus 10A according to a second embodiment of the present invention will be described below with reference to FIGS. 3, 6A, and 6B. Parts of the power transmitting apparatus 10A, which are structurally or functionally identical to parts of the power transmitting apparatus 10 according to the first embodiment, are denoted by identical reference characters, and such features will not be described in detail below.

The power transmitting apparatus 10A according to the second embodiment basically is identical in structure to the power transmitting apparatus 10 according to the first embodiment, but differs therefrom with respect to the control process carried out by a control processor 86A (see FIG. 3) in order to equalize the power outputs of the right unit 16 and the left unit 18. Essentially, in step S6 of the processing sequence shown in FIG. 5, the power output of the motor associated with the clutch with a decreased torque transmission ratio is lowered to a level at which the torque transmission ratio does not decrease (step S6A, not shown).

For example, the control processor 86 determines that the torque transmission ratio $X_R$ of the right clutch RC has dropped from 100% to 80%. Then, the control processor 86 lowers the torque $T_R$ of the right motor RM to a level at which the torque transmission ratio $X_R$ is back in the vicinity of 100%, and sends a control signal CS based on the lowered torque $T_R$ to the supply controller 22. As a result, the power output of the right motor RM is lowered, thereby preventing the right clutch RC from slipping. Consequently, the right unit 16 can transmit the rotational drive power of the right motor RM smoothly to the right shaft RS.

The control processor 86 also lowers the torque $T_L$ of the left motor LM into agreement with the torque $T_R$ of the right motor RM, which has been varied as described above. In other words, both the torque $T_R$ of the right motor RM and the torque $T_L$ of the left motor LM are varied in agreement with each other, within a stable transmission region at which the torques $T_R$, $T_L$ are equal to or less than the allowable transmission torques $T_{Rmax}$, $T_{Lmax}$. Consequently, by the rotational drive power of the right unit 16 and the left unit 18 being brought substantially into agreement, the vehicle 12 can easily be controlled to travel smoothly.

As described above, the power transmitting apparatus 10A according to the second embodiment decreases the power output of the motor M that is associated with the clutch C, the torque transmission ratio of which has decreased, to a level at which the torque transmission ratio does not decrease. Consequently, the vehicle 12 is driven with the clutch C being prevented from slipping, and hence the clutch C is protected against damage. Inasmuch as the ECU 24 controls the right unit 16 and the left unit 18 so as to equalize the torque $T_R$ of the right motor RM and the torque $T_L$ of the left motor LM, the rotational drives of the right rear wheel RRW and the left rear wheel LRW are easily brought into agreement with each other, for thereby achieving good driving performance of the vehicle 12.

Third Embodiment

As shown in FIG. 7, a power transmitting apparatus 10B according to a third embodiment of the present invention is mounted as a supplementary power source on a vehicle 13, which has a main power source for driving the front wheels FW of the vehicle 13. The vehicle 13 includes, on the front wheel FW side, an HEV (Hybrid Electric Vehicle) system 90 for rotating the front wheels FW, and a transmission 92 for transmitting the rotational drive power from the HEV system 90 at different gear ratios. The HEV system 90 includes an internal combustion engine 90a and an electric motor 90b, which serve as the main power source. The power transmitting apparatus 10B serves as a supplementary power source to rotate rear wheels RW, which are used as drive wheels, in addition to the front wheels FW that are rotated by the HEV system 90. The main power source on the vehicle 13 is not limited to the HEV system 90, but may comprise any of various other prime movers. The roles of the HEV system 90 and the power transmitting apparatus 10B may be changed as a master and a slave. In other words, the power transmitting apparatus 10B may serve as the main power source, whereas the HEV system 90 serves as the supplementary power source.

The power transmitting apparatus 10B according to the third embodiment basically is identical in structure to the power transmitting apparatus 10 according to the first embodiment, but differs therefrom with respect to the control process that is carried out by the control processor 86B (see FIG. 3) in order to control the right unit 16 and the left unit 18.

Figure 5:
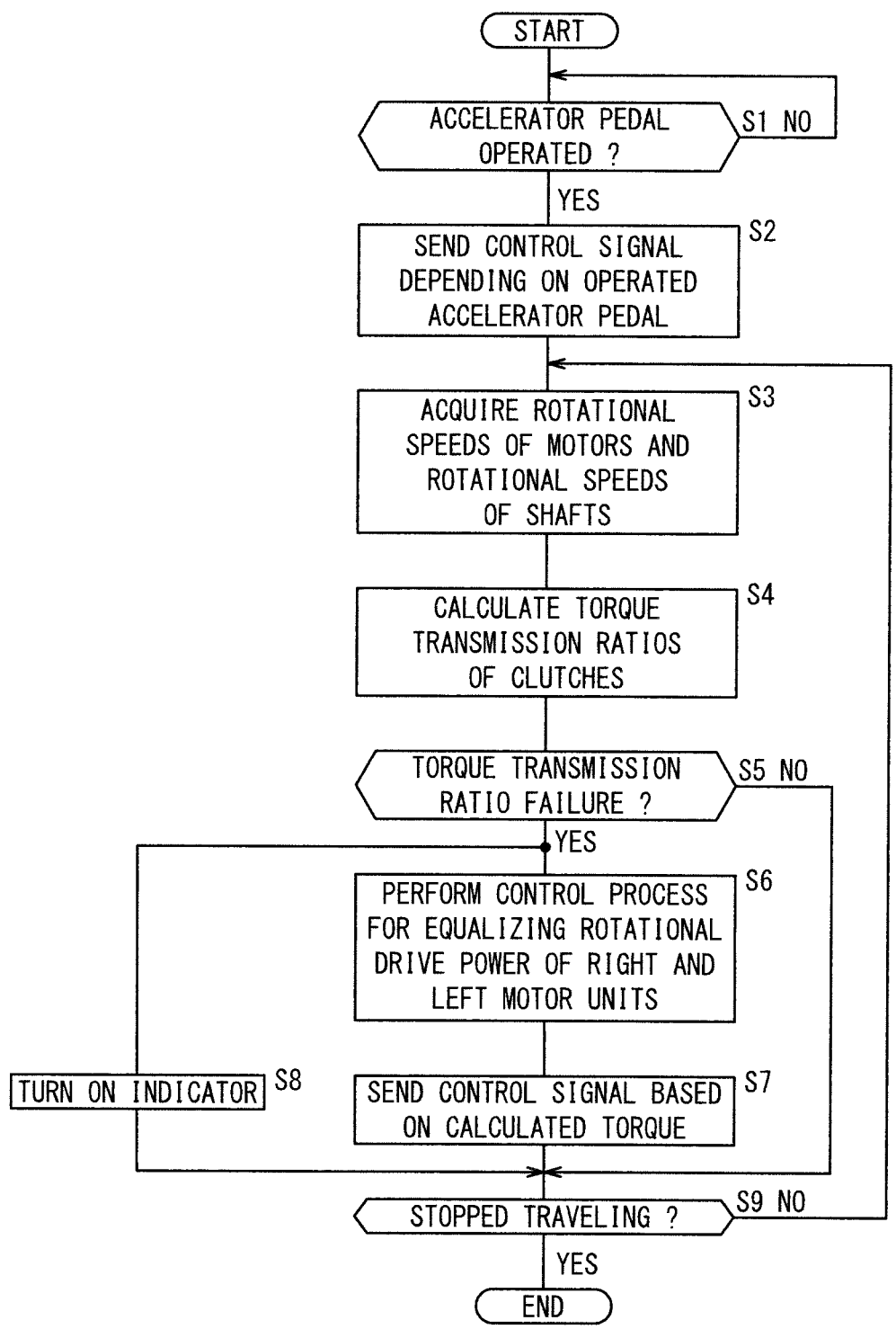
FIG. 5 is a flowchart of a processing sequence of the ECU shown in FIG. 1.

More specifically, in step S5 of the processing sequence shown in FIG. 5, if the control processor 86B determines that the difference between the torque transmission ratios $X_R$, $X_L$ of the right clutch RC and the left clutch LC is equal to or greater than a predetermined value, the control processor 86B is operated to disengage the right clutch RC and the left clutch LC (step S6B, not shown). In other words, the control processor 86B brings the clutch plates 49a, 49b and the clutch disks 52a, 52b out of contact with each other in order to cut off transmission of rotational drive power from the right unit 16 and the left unit 18. The transmitting mechanisms 46 and the constant velocity joints 66 of the right unit 16 and the left unit 18 are kept in a free state, thereby allowing the rear wheels RW to rotate passively while the front wheels FW are driven rotatably by the HEV system 90.

When the clutches C are disengaged, instead of performing step S7 of the above processing sequence, the control processor 86B preferably stops the supply of electric power to the right motor RM and the left motor LM (step S7A, not shown). Accordingly, the battery 20 can minimize undue consumption of electric energy stored in the battery 20.

As described above, the power transmitting apparatus 10B according to the third embodiment can stop transmission of the rotational drive power from the right unit 16 and the left unit 18, thereby allowing the vehicle 13 to continue being driven by only the HEV system 90. Since the clutches C are free of undue burdens when the clutches C are disengaged, the right unit 16 and the left unit 18 (the clutches C) can be protected against damage.

Preferred embodiments of the present invention have been described in detail above. However, the present invention is not limited to the illustrated embodiments, and various changes and modifications may be made to the embodiments without departing from the scope of the invention. For example, the power sources of the right rear wheel RRW and the left rear wheel LRW are not limited to the right motor RM and the left motor LM (electric motors), but may comprise an internal combustion engine or an HEV (Hybrid Electric Vehicle) system having an electric motor and an internal combustion engine.

The control processes according to the first through third embodiments may be combined. For example, if the difference between the torque transmission ratios $X_R$, $X_L$ of the right clutch RC and the left clutch LC is small, then step S6A according to the second embodiment may be executed, and if the difference between the torque transmission ratios $X_R$, $X_L$ of the right clutch RC and the left clutch LC is large, then step S6 according to the first embodiment may be executed. Such a combined control process is effective to protect the clutches C against damage during an initial stage in which the clutches C start slipping. Such a combined control also prevents the power outputs of the power transmitting apparatus 10 from being lowered excessively in a condition in which the clutches C are slipping significantly.

What is claimed is:

1. A power transmitting apparatus comprising:
   a pair of drive units connected respectively to a left drive wheel and a right drive wheel of a vehicle, the drive units having respective clutches configured to selectively transmit and block drive power from respective prime movers, wherein the drive power from one of the prime movers is transmittable to one of the left and right drive wheels via one of the clutches and the drive power from another of the prime movers is transmittable to another of the left and right drive wheels via another of the clutches; and
   a controller configured to detect respective power transmitting capabilities of the respective clutches, calculate a difference between the power transmitting capabilities of the respective clutches, and adjust the drive power from the one or other prime mover or the power transmitting capabilities of the clutches if the difference between the power transmitting capabilities of the respective clutches is equal to or greater than a predetermined value.

2. The power transmitting apparatus according to claim 1, wherein the controller acquires respective torque transmission ratios of the clutches as the power transmitting capabilities of the clutches, based on rotational speeds of respective output shafts of the prime movers and rotational speeds of the drive wheels.

3. The power transmitting apparatus according to claim 1, wherein if the power transmitting capability of one of the drive units is lowered, the controller lowers the drive power from the prime mover of another of the drive units to a level at which respective power outputs transmitted from the drive units to the drive wheels are equal to one another.

4. The power transmitting apparatus according to claim 1, wherein if the power transmitting capability of one of the drive units is lowered, the controller lowers the drive power from the prime mover of the one of the drive units to a level such that the power transmitting capabilities of the clutches do not decrease.

5. The power transmitting apparatus according to claim 4, wherein the controller is configured to adjust the drive power from the prime mover of another of the drive units to be the same as the drive power from the prime mover of the one of the drive units.

6. The power transmitting apparatus according to claim 1, wherein if the power transmitting capability of one of the drive units is lowered, the controller disengages both of the clutches of the drive units.

7. The power transmitting apparatus according to claim 1, further comprising:
   an indicating unit configured to indicate to an occupant of the vehicle a reduction in the power transmitting capability of one of the drive units, if the power transmitting capability of the one of the drive units is reduced.

* * * * *